United States Patent
Quick et al.

(10) Patent No.: US 8,574,740 B2
(45) Date of Patent: Nov. 5, 2013

(54) MOLDED FRAME WITH CORRUGATED COOLING FIN FOR AIR-COOLED BATTERY

(75) Inventors: Megan J. Quick, Honeoye Falls, NY (US); Derek R. Weber, Mendon, NY (US); Thaddeus J. Grey, Canandaigua, NY (US); Michael Duffield, Medina, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 408 days.

(21) Appl. No.: 12/853,521

(22) Filed: Aug. 10, 2010

(65) Prior Publication Data

US 2012/0040222 A1 Feb. 16, 2012

(51) Int. Cl.
*H01M 2/24* (2006.01)
*H01M 6/42* (2006.01)
*H01M 10/50* (2006.01)

(52) U.S. Cl.
USPC ........... 429/120; 429/149; 429/156; 429/158; 429/159

(58) Field of Classification Search
USPC .......................... 429/120, 149, 156, 158, 159
See application file for complete search history.

(56) References Cited

U.S. PATENT DOCUMENTS

| | | | |
|---|---|---|---|
| 6,060,198 A | 5/2000 | Snaper | |
| 6,410,184 B1 | 6/2002 | Horiuchi et al. | |
| 6,821,671 B2 | 11/2004 | Hinton et al. | |
| 7,504,179 B2 | 3/2009 | Tanjou et al. | |
| 2003/0017380 A1 | 1/2003 | Cooper et al. | |
| 2003/0211384 A1 | 11/2003 | Hamada et al. | |
| 2004/0038122 A1 | 2/2004 | Hisamitsu et al. | |
| 2005/0089750 A1 | 4/2005 | Ng et al. | |
| 2005/0089751 A1 | 4/2005 | Oogami et al. | |
| 2007/0141457 A1 | 6/2007 | Amagai | |
| 2008/0193830 A1 | 8/2008 | Buck et al. | |
| 2009/0142628 A1 | 6/2009 | Okada et al. | |
| 2009/0325051 A1 | 12/2009 | Niedzwiecki et al. | |
| 2010/0055993 A1 | 3/2010 | Ikeda et al. | |
| 2010/0266883 A1* | 10/2010 | Koetting et al. | 429/96 |
| 2010/0273091 A1 | 10/2010 | Brey et al. | |
| 2011/0052969 A1 | 3/2011 | Cai et al. | |
| 2011/0162820 A1 | 7/2011 | Weber et al. | |
| 2011/0293982 A1* | 12/2011 | Martz et al. | 429/120 |

FOREIGN PATENT DOCUMENTS

| | | | |
|---|---|---|---|
| JP | 11176400 A | * | 7/1999 |
| JP | 2009105058 A | * | 5/2009 |
| KR | 2010 081674 A | | 7/2010 |

OTHER PUBLICATIONS

Arima et al., Machine translation of JP 11-176400 A, Jul. 1999.*
Goto et al., Machine transition of JP 2009-105058 A, May 2009.*
U.S. Office Action dated Jun. 8, 2012 pertaining to U.S. Appl. No. 12/853,462, filed Aug. 10, 2010.

(Continued)

Primary Examiner — Sean P Cullen
(74) Attorney, Agent, or Firm — Dinsmore & Shohl LLP (57) ABSTRACT

A molded cooling fin and frame is described. The molded cooling fin and frame includes a corrugated center cooling fin; a pair of outer cooling fins on opposite sides of the corrugated center cooling fin, each of the outer cooling fins having a ridge around an edge; and a frame covering an edge of each of the outer cooling fins, the frame sealed to the edge of each of the outer cooling fins. A battery pack including the molded cooling fin and frame and a method of making the molded cooling fin and frame are also described.

18 Claims, 12 Drawing Sheets

(56) References Cited

OTHER PUBLICATIONS

Office Action mailed Jul. 30, 2012 related to U.S. Appl. No. 12/774,873.
Office Action mailed Jan. 4, 2013 pertaining to U.S. Appl. No. 12/774,873.
Office Action mailed Jan. 17, 2013 pertaining to U.S. Appl. No. 12/853,462.
U.S. Non-Final Office Action dated Feb. 6, 2013 pertaining to U.S. Appl. No. 12/853,620, filed Aug. 10, 2010.
Office Action mailed Sep. 20, 2012 pertaining to U.S. Appl. No. 12/774,873.
Final Office Action dated May 31, 2013 pertaining to U.S. Appl. No. 12/853,620, filed Aug. 10, 2010.
Non-Final Office Action dated May 22, 2013 pertaining to U.S. Appl. No. 12/774,873, filed May 6, 2010.
Final Office Action dated Mar. 1, 2013 pertaining to U.S. Appl. No. 12/774,873, filed May 6, 2010.

* cited by examiner

MOLDED FRAME WITH CORRUGATED COOLING FIN FOR AIR-COOLED BATTERY

STATEMENT OF RELATED CASES

This application is related to U.S. Ser. No. 12/853,462, entitled INTEGRATED STACKABLE BATTERY, filed on Aug. 10, 2010, which is incorporated herein by reference.

BACKGROUND OF THE INVENTION

This invention relates generally to battery packs and more particularly to molded frame with a corrugated cooling fins for use with an air-cooled battery pack.

Currently, the battery cells in some air-cooled battery packs are positioned in frames which are used to house the cells, cooling fins (plates), and expansion material, such as foam sheets. In some cases, the cooling fin is sealed to the frame using a two shot santoprene seal. The santoprene has to be glued to the cooling fin to allow for the compression set of the cooling fin. While the santoprene and glue seal is effective in sealing the system and supporting the cooling fin, the method is complex and expensive.

Therefore, there is a need for a frame that simplifies the assembly process for battery packs, reduces the cost, and/or eliminates the glue between the cooling fin and the frame.

SUMMARY OF THE INVENTION

The present invention meets this need. One aspect of the invention is a molded cooling fin and frame. The molded cooling fin and frame includes a corrugated center cooling fin; a pair of outer cooling fins on opposite sides of the corrugated center cooling fin, each of the outer cooling fins having a ridge around an edge; and a frame covering an edge of each of the outer cooling fins, the frame sealed to the edge of each of the outer cooling fins.

Another aspect of the invention involves a battery pack. The battery pack includes a pair of end frames, one end frame having a positive terminal and the other end frame having a negative terminal; at least one molded cooling fin and frame comprising: a corrugated center cooling fin; a pair of outer cooling fins on opposite sides of the corrugated center cooling fin, each of the outer cooling fins having a ridge around an edge; and a frame covering an edge of each of the outer cooling fins, the frame sealed to the edge of each of the outer cooling fins; a plurality of battery cells, each of the plurality of battery cells having a positive tab and a negative tab, the positive tab of one of the plurality of battery cells electrically connected to the positive terminal, and the negative tab of another one of the plurality of battery cells electrically connected to the negative terminal; and at least one power connector electrically connecting the negative tab of one of the battery cells with the positive tab of an adjacent one of the plurality of battery cells.

Another aspect of the invention is a method of making a molded cooling fin and frame. The method includes molding a frame portion over an edge of an outer cooling fin forming a seal between the frame and the outer cooling fin to form a half frame, the outer cooling fin having a ridge around an outer edge; placing a pair of half frames around a center corrugated cooling fin; and connecting the pair of half frames together.

DETAILED DESCRIPTION

The molded cooling fin and frame combines the frame with the cooling fin. The design provides a well sealed part without the necessity of a separate seal or glue between the cooling fin and the frame. The molded cooling fin and frame reduces the number of parts needed to assemble the battery pack, simplifying assembly. The seal between the frame and the cooling fin is provided by molding. The seal keeps the incoming air separate from the air from the cell.

The cooling fin is designed to uptake the tolerances and expansion of the battery cell and to apply uniform pressure to the cell using a corrugated center fin and a pair of flat outer cooling fins. The outer cooling fins have a ridge around the outside edge, which allows the part to flex in the middle without exerting extra stress on the sealing surface formed by the insert molded joint around the edge of the cooling fin. The ridge is most effective if it extends all the way around the edge of the outer cooling fin because this completely decouples the forces from the center of the cooling fin from the seal at the edge. However, in some situations, a ridge which extends only partially around the outer cooling fin could be used. In this case, some forces would be transferred to the joint, but the forces should not sufficient to affect the sealed joint. The size and shape of the ridge can be designed based on the loads involved and the space available around the cell. The geometry should permit deformation of the ridge to allow movement and prevent the transfer of load to the sealed joint. A higher ridge in the through plane cell direction would be the most effective in preventing the load from affecting the sealed joint. A shorter ridge would have less room to deform and as a result would be less effective in preventing forces from transferring to the joint. The raised part of the ridge will typically face away from the corrugated center cooling fin, although this is not required.

The corrugated center fin keeps uniform pressure on the battery cell, and keeps the battery cell from collapsing the cooling fin air gap. The frame acts as the structure for the battery cell and restrains the battery cell and the cooling fin.

Figure 1:
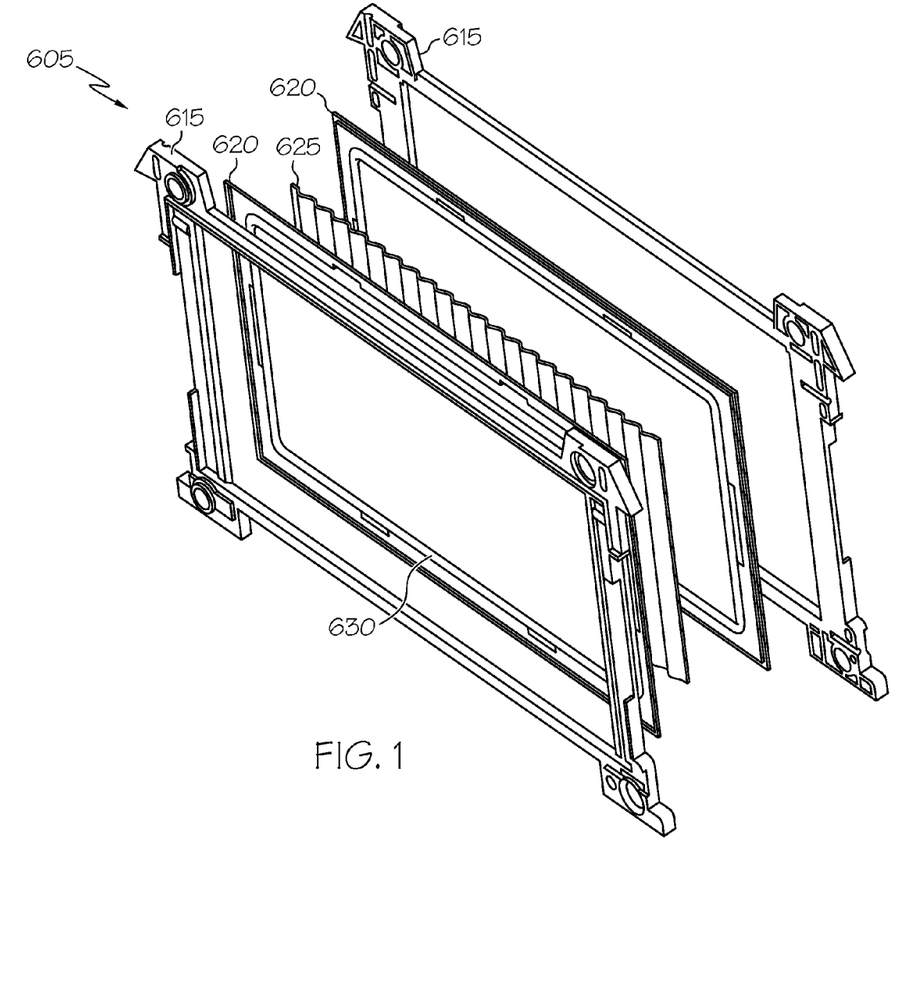
FIG. 1 is an exploded view of one embodiment of the molded cooling fin and frame.
Figure 2:
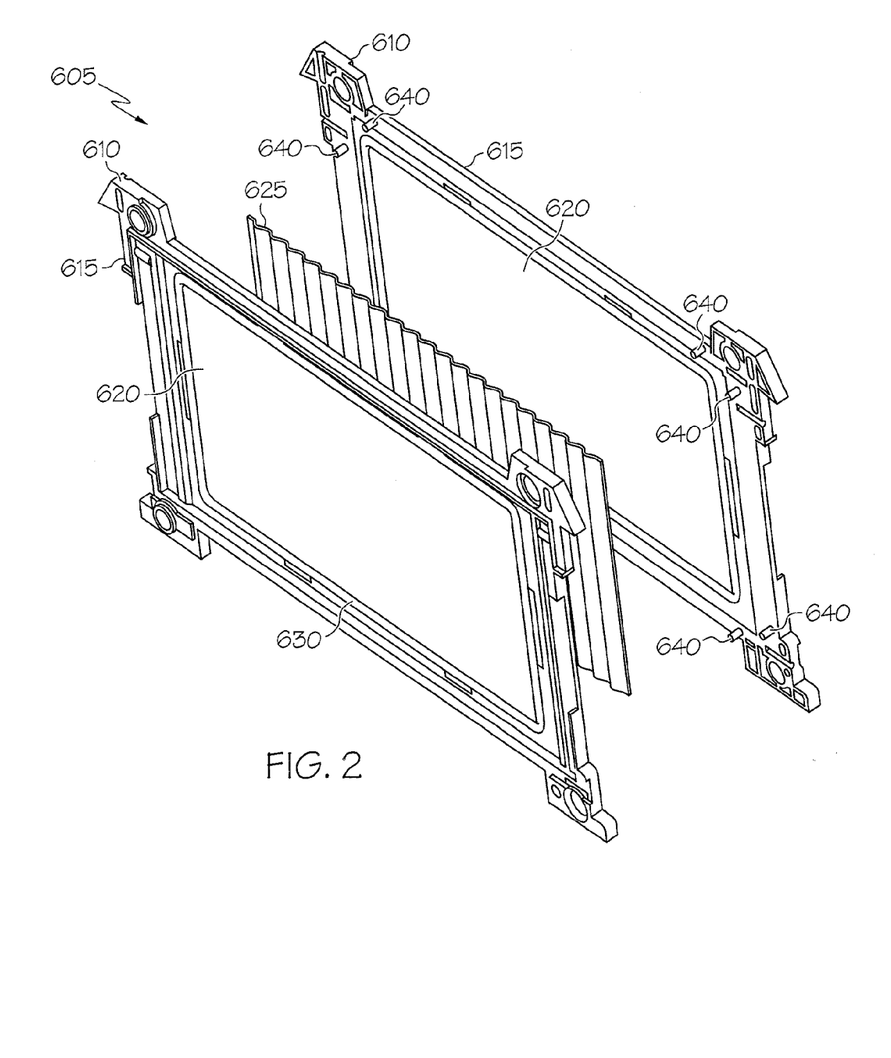
FIG. 2 is an another exploded view of one embodiment of the molded cooling fin and frame.

FIG. 1-2 show one embodiment of the molded cooling fin and frame 605. There are two half frames 610, each with a frame portion 615 and an outer cooling fin 620. There is a corrugated center fin 625 between the two half frames 610. The outer cooling fins 620 are flat and have a ridge 630 extending around the outer edge. The raised surface of the ridge 630 faces outward.

The outer cooling fins 620 are molded into separate halves of the frame. The outer cooling fins can be molded into the half frames using any suitable molding process, including, but not limited to, injection molding, such as insert molding, compression molding, transfer molding, and the like.

The half frames 610 are combined around the corrugated center fin 625. The two half frames 610 can be combined using any suitable process, including, but not limited to, heat staking, ultrasonic welding, laser welding, vibration welding, mechanical connections, glue, and the like. Heat staking and mechanical connections may require an additional step to provide a seal between the frames, for example with glue or another sealant, which is less desirable.

In another embodiment, the outer cooling fins are insert molded into separate half frames, and compression limiters 640 (as shown in FIG. 2) are used to allow the half frames to move with respect to each other. The compression limiters 640 set the repeat distance for the frames. The corrugated center fin would be installed in the half frames in the plant with this embodiment.

Alternatively, the outer cooling fins could be positioned around the corrugated center fin and the frame molded around all three layers.

Figure 3:
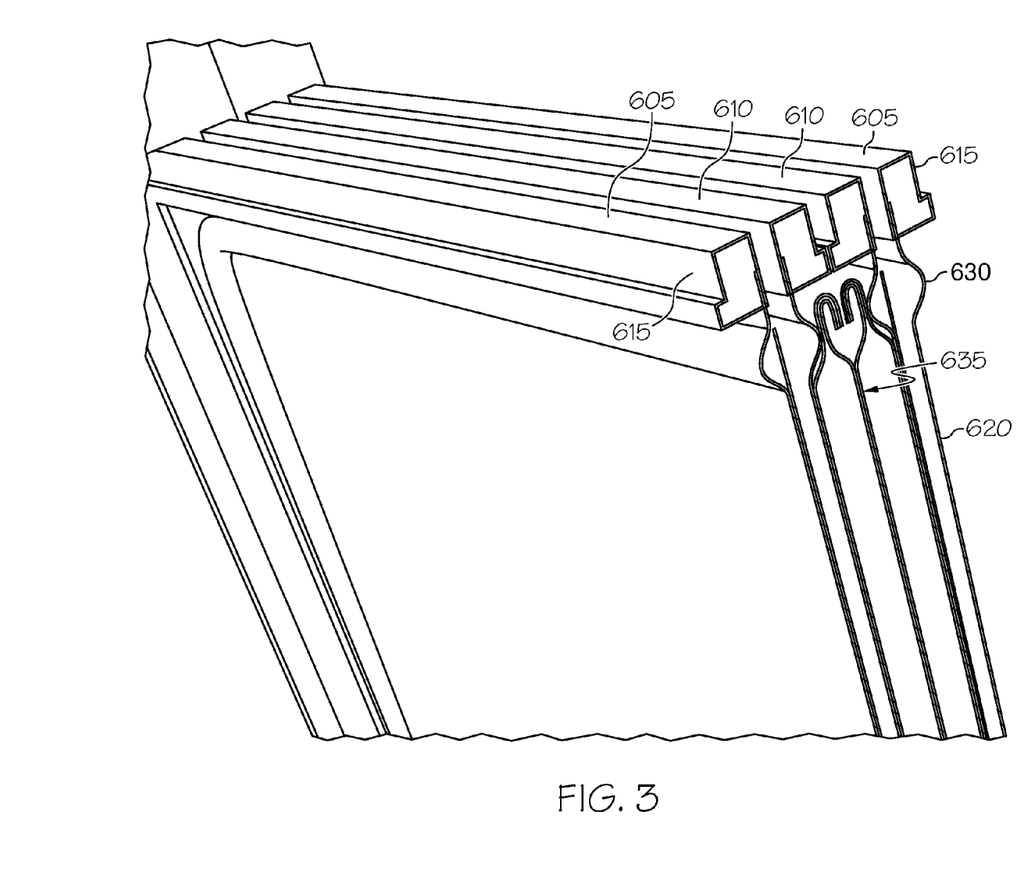
FIG. 3 is illustration of one embodiment of a battery cell and the molded cooling fin and frame.

FIG. 3 shows two molded cooling fin and frames 605 on opposite sides of a battery cell 635. Each molded cooling fin and frame 605 includes a pair of half frames 610 with an outer cooling fin 620 and frame portion 615 separated by corrugated center fin (not shown). The ridge 630 helps to position the battery cell 635.

The corrugated center fin and outer cooling fins can be made of any conventional material for cooling plates or fins. Suitable materials include, but are not limited to, conductive materials, including conductive metals. Light-weight thermal conductors, such as aluminum, are particularly suitable due to their cost, weight, and formability.

The frames are typically made of a light-weight, non-conductive material. Suitable materials include, but are not limited to, plastics, such as polypropylene, nylon 6-6, and other low cost materials. The frames can be fiber-reinforced for structural strength, if desired.

Air-cooled battery packs have several advantages over liquid-cooled battery packs. They are less complicated than because they do not require a special cooling loop and radiator. In addition, they are cleaner because they do not use liquid coolant.

The molded cooling plate and frame can include one or more design features described in U.S. Ser. No. 12/853,462, entitled INTEGRATED STACKABLE BATTERY, filed on Aug. 10, 2010, which is incorporated herein by reference. The design features include: optimal tab location and size; an embedded power connector with spring action contact mechanism or slot for external power connector; embedded thermal monitoring; embedded voltage monitor/cell charging wire; embedded local cell components of the battery management system; embedded heating/cooling fin including pouch contact mechanism; embedded heat exchanger; embedded surfaces to isolate tab edges to minimize leakage/shorts; and error proof assembly features.

Figure 4:
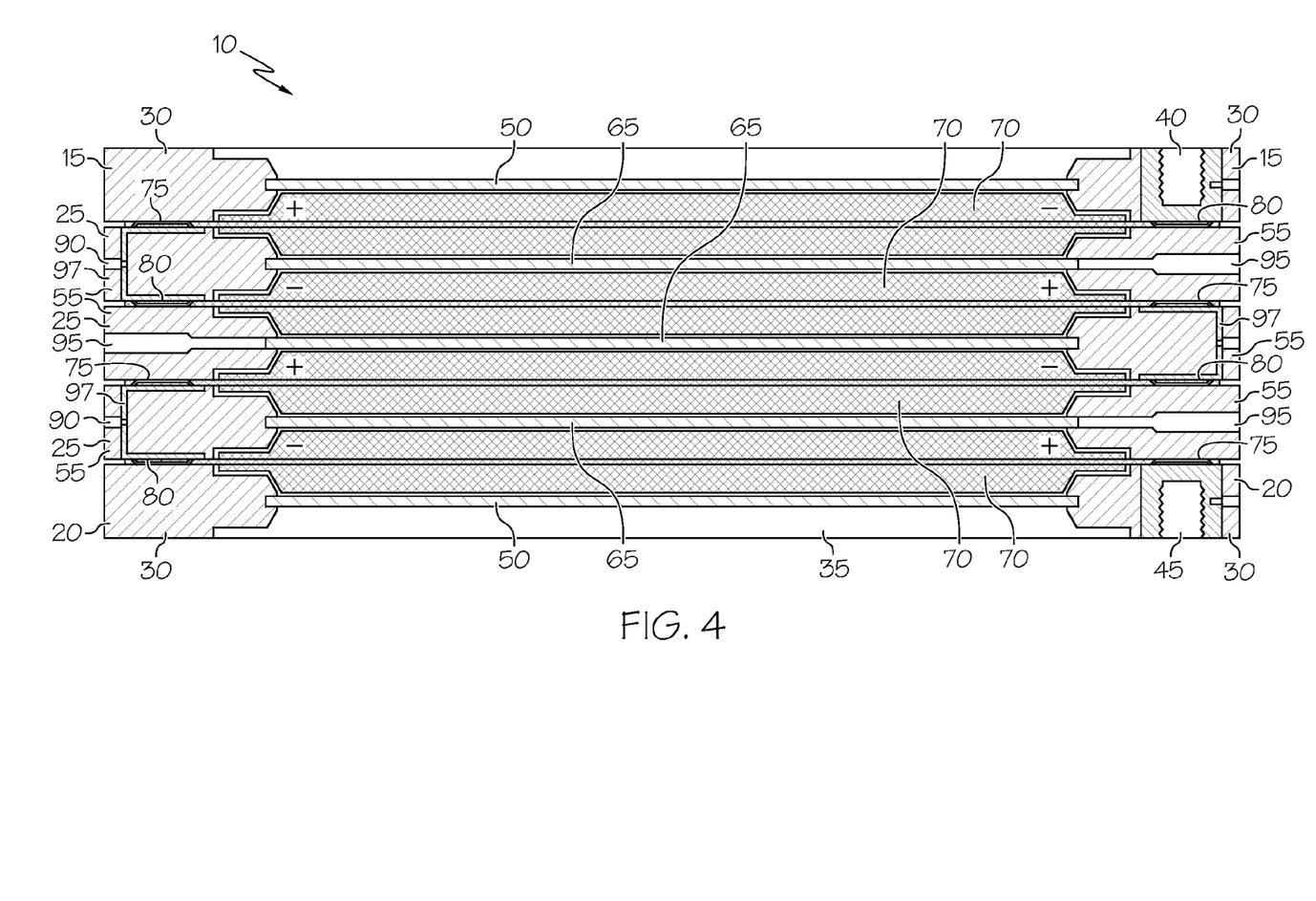
FIG. 4 is top plan view of one embodiment of an assembled battery pack.
Figure 5:
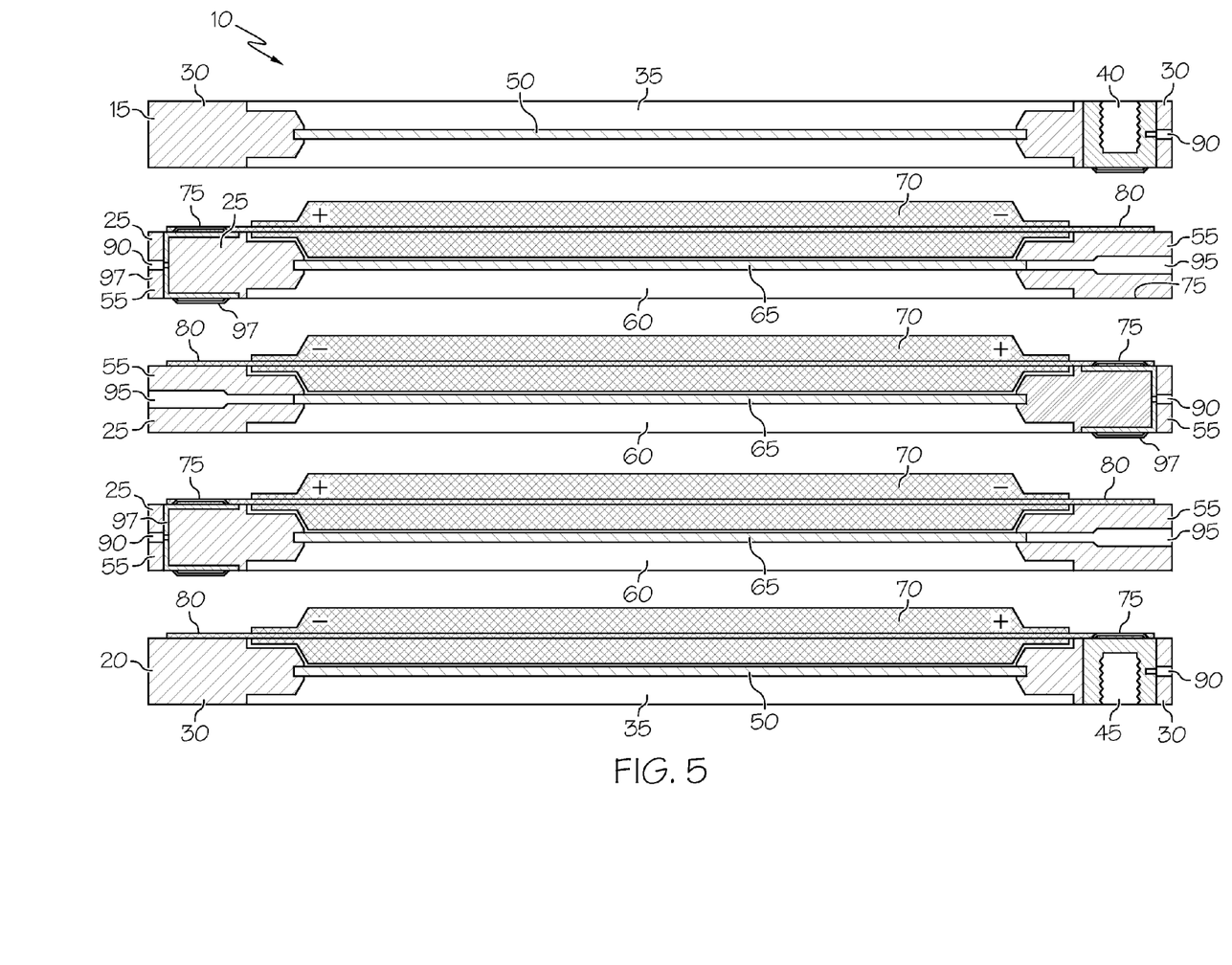
FIG. 5 is an exploded view of the embodiment of FIG. 4.

FIGS. 4-5 show one embodiment of a battery pack 10. The battery pack 10 has a pair of end frames 15, 20 and frames 25 positioned between the end frames 15, 20. The end frames 15, 20 have raised edge portions 30 surrounding an inner portion 35. The inner portion 30 is typically open as shown (i.e., like a picture frame). However, there could be a thin layer extending all or part way across the inner portion, if desired. There is a negative terminal 40 in end frame 15 and a positive terminal 45 in end frame 20. The terminals can be suitable type of terminal including, but not limited to, threaded sockets and threaded studs.

The end frames 15, 20 can include a cooling fin 50 extending across all or a portion of the inner portion 35, if desired.

The frames 25 have raised outer portions 55 surrounding inner portions 60. The inner portion 60 is typically open as shown (i.e., like a picture frame), although there could be a thin layer extending across all or part of the inner portion. The frames 25 can include a cooling fin (plate) 65 extending partially or completely across the inner portion 60, as described above, if desired.

There is at least one frame 25 in addition to the two end frames in the battery pack 10, and typically there are many. In most cases, there will be one less frame than the number of battery cells connected in series. For example, if there are 18 battery cells connected in series, there could be 17 frames. In some cases, there may be the same number of frames and cells.

Battery cells 70 are positioned in the inner portion 60 of the frames 25 and end frame 20. The battery cells 70 have positive tabs 75 and negative tabs 80. The battery cells 70 and the positive tabs 75 and negative tabs 80 are supported by the raised edge portions 55 of the frames 25 or the raised edge portions 30 of the end frame 20 depending on their location in the pack. The raised edge portions of the frames and end frames are designed to support (or cradle) the battery cell and tabs. The design of the raised portions depends on the particular battery cells being used. The cooling fins 50 and 65, if present, could also partially support the battery cells.

As shown, the positive battery tab 75 is on the opposite side of the battery cell from the negative tab 80. Having the cell tabs on opposite sides of the cell creates more uniform heat generation. When the cell tabs are close to one another or on one side, they tend to have a higher heat concentration and higher differences in temperature over the volume of the cell that can result in localized hot spots. However, these arrangements of cell tabs can be used with appropriate cooling. In addition, cell manufacturers also have cell tabs of various other configurations. The particular arrangement of cell tabs is not important, and frame assemblies can be made to match cell tabs of any configuration.

The frames and/or the end frames can optionally include voltage sensor holes 90 and temperature sensor holes 95. One desirable arrangement has the voltage sensor holes and temperature sensor holes on opposite sides of the frame, although this is not required. In addition, some frames might have only voltage sensor holes, others might have only temperature sensor holes, and some frames might not have either; however, the use of these options would increase the number of parts required. The voltage sensors and temperature sensors can be connected to a battery management system (described below) if desired. Other types of sensors could also be used, if desired. The sensor holes could be designed to accommodate a particular type of sensor, or one sensor hole could be designed to accommodate a variety of sensors.

The positive and negative tabs of adjacent battery cells are electrically connected by power connectors 97. The power connectors are made of conductive materials. The power connectors can be internal or external.

Figure 6:
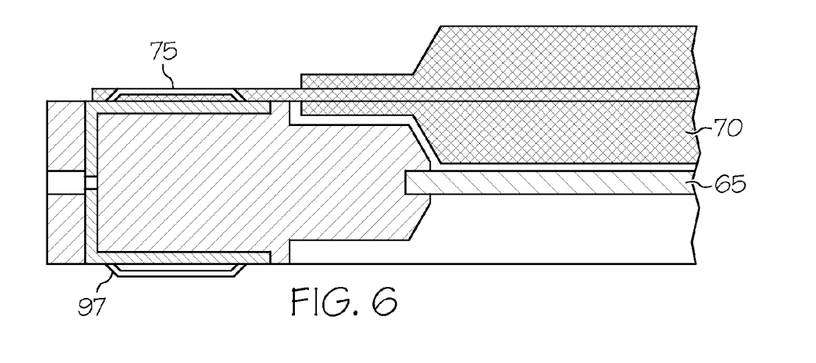
FIG. 6 is an illustration of one embodiment of an internal power connector.

FIG. 4-6 show one embodiment of an internal power connector 97 embedded in the frame. The internal power connector 97 is generally U-shaped and extends though the frame with each leg of the U forming a contact surface on opposite sides of the frame. The internal power connector can be spring loaded to assist in obtaining good contact with the cell tab, if desired. Pressure is applied to the power connectors by, for example, bolts extending through the stack of frames, to provide the necessary contact between the cell tabs and the power connectors to obtain a low resistance connection.

Good electrical connection between the power connector and the tabs is related to the amount of surface contact area between them. One large surface area may have difficulty in making complete contact with the cell tab if the two surfaces are not parallel. For example, a high spot at one end may not allow the opposite end to move far enough to make solid contact. The surface of the power connector can be segmented by adding slits or cuts providing multiple smaller surfaces, each having increased independent movement. Consequently, a high spot on at one end will not prevent the next segment from making good contact.

In addition, the surface roughness of the connector can be modified by chemical or mechanical abrasives, or by depositing a coating on the surface.

Figure 7:
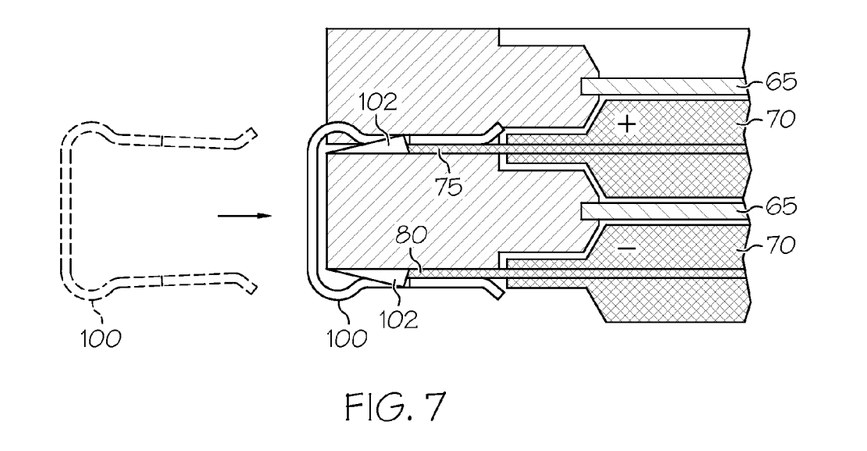
FIG. 7 is an illustration of one embodiment of a spring loaded metal clip used to connect battery cells.

One embodiment of an external power connector is a spring loaded conductive clip 100 shown in FIG. 7. The spring force of the clips is typically in the range of about 500 to about 1500 N. The clip can be made of a conductive material, including, but not limited to, metals. One example of suitable material for a clip is spring steel coated or clad (or another process) with copper and nickel.

Figure 8:
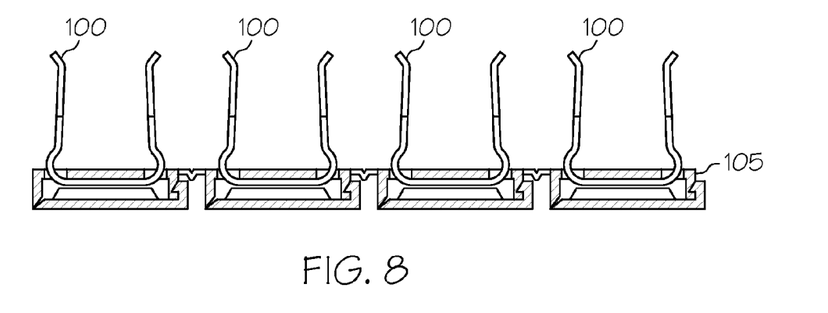
FIG. 8 is an illustration of a bandoleer of spring loaded metal clips.

A series of clips 100 can be attached to a non-conducting flexible strip, or bandoleer, 105, as shown in FIG. 8. The clips are spaced on the bandoleer so that they can be inserted into the molded slots on alternating frames that encase the stack of prismatic battery cell. In one embodiment where the positive and negative tabs are on opposite sides of the battery cell, there would be one bandoleer on each side of the battery pack in order to form the necessary connections. This allows for some dimensional variation in the stack. The frame and clips can be designed to ease the assembly and disassembly process, minimize wear on the cell tab surface, and maintain low-resistance electrical conduct after assembly.

The bandoleer can be made of a non-conducting flexible material, such as a plastic. Examples of suitable plastics include, but are not limited to, polypropylene or nylon. It could be a molded part with a strip of plastic between the holder to allow some movement along its length. Instead of using the voltage sensor holes to monitor the voltage, the bandoleers can provide electrical monitor wires at each clip, which are bundled in the bandoleer for connection to a common battery management system.

The battery management system can monitor one or more conditions within the battery pack, including, but not limited to, the voltage, the current, and the temperature at selected points in the battery pack, if desired. The resulting readings can be used for a variety of purposes, such as diagnostics or running the vehicle in a different mode. During a charge cycle, the battery management system can prevent overcharging of individual cells by transferring energy using simple resistors or potentially to adjacent cells that are capable of absorbing the energy, depending on the design of the battery management system.

When external power connectors are used, the battery stack remains a low voltage (e.g., 3 V) system until the bandoleers are fully inserted and returns to a low voltage system at the moment either bandoleer is partially disengaged. This provides an opportunity for significant improvement in electrical safety during manufacturing, servicing at the dealers, and remanufacturing. Manufacturing costs can be reduced because of the significant reduction in the high voltage areas of the plant by installing the bandoleer at final assembly just before closing the cover. In addition, cell charging can be done conveniently and more economically on individual cells after assembly, but before installing the bandoleer.

The ability to disengage the high voltage by pulling the bandoleer immediately after removal of the battery cover enables more repair options, including individual cell replacement, which can allow for a greater role by dealers in the repair process.

Pressure is applied directly by the elastic properties of the clip to maintain low-resistance electrical contact. This reduces or eliminates the reliance on pressure applied through the frame stack (e.g., using one or more bolts though the frames and end frames) which may be subject to dimensional variation in the stack.

In one embodiment, the frames and clips can include ramp 102 and notch features, respectively, to keep the clip open and mechanically prevent the clip from sliding across the cell tabs during the insertion process. A ramp 102 in the slot forces the prongs of the clip open until the notch clears the ramp, at which time the clip snaps vertically onto the cell tab surfaces. This results in zero or minimal sliding of the clip on the cell tab surface during insertion.

An insertion tool can be used in assembly and disassembly. The tool is temporarily attached to the bandoleer, forcing the clips to open wider than is required to pass over the ramp without touching. The tool eliminates the need to apply excessive force or to tap the battery frame during assembly. The tool can also be used to disengage the bandoleer by opening the clips wide enough to clear the locking mechanism in the ramp-notch feature. The pins on the tool open and close the clip opening in the direction vertical to the tab contact, so no wear occurs on the electrode surface.

Figure 9:
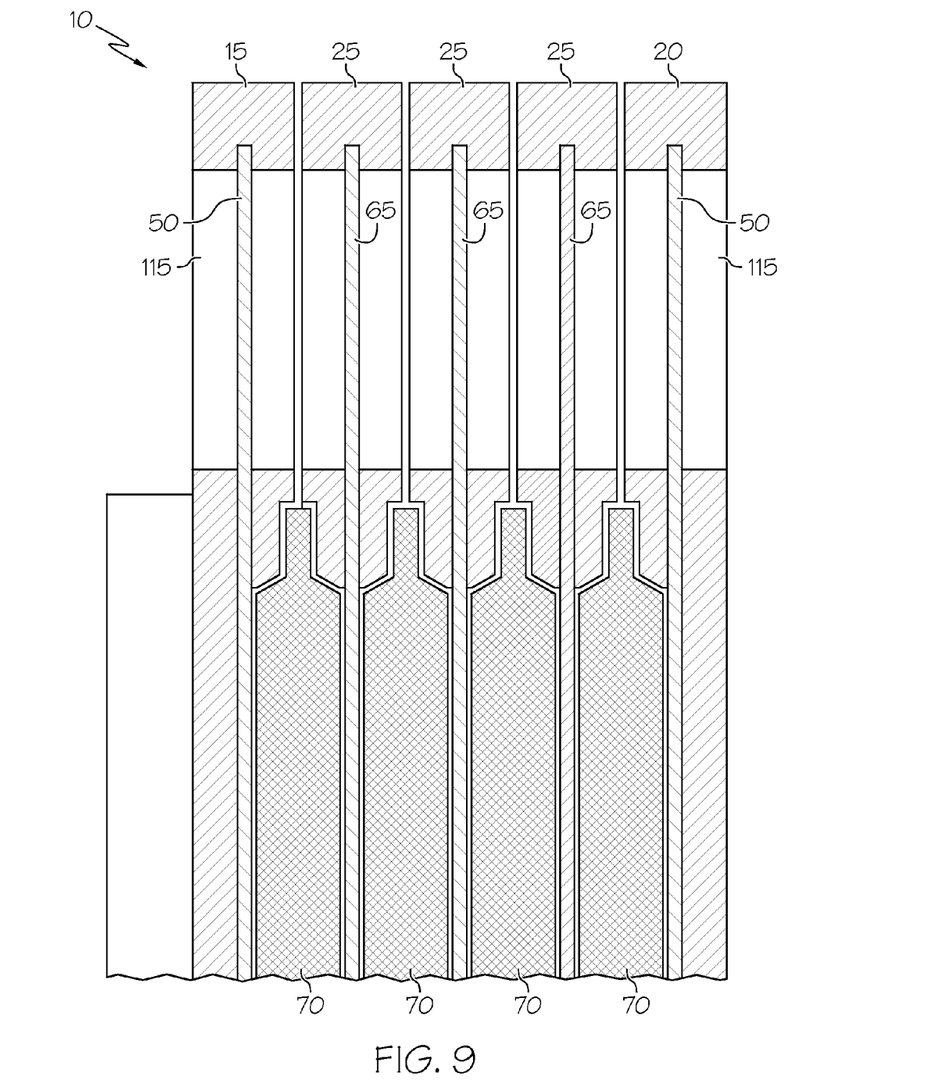
FIG. 9 is a portion of a top plan view of one embodiment of an assembled battery pack.

FIG. 9 shows a portion of an embodiment of the battery pack 10 which includes cooling channels 115 in the end frames 15, 20 and frames 25. The cooling channels are open spaces for a flow path to allow the coolant to pass over the exposed cooling fin.

Figure 10:
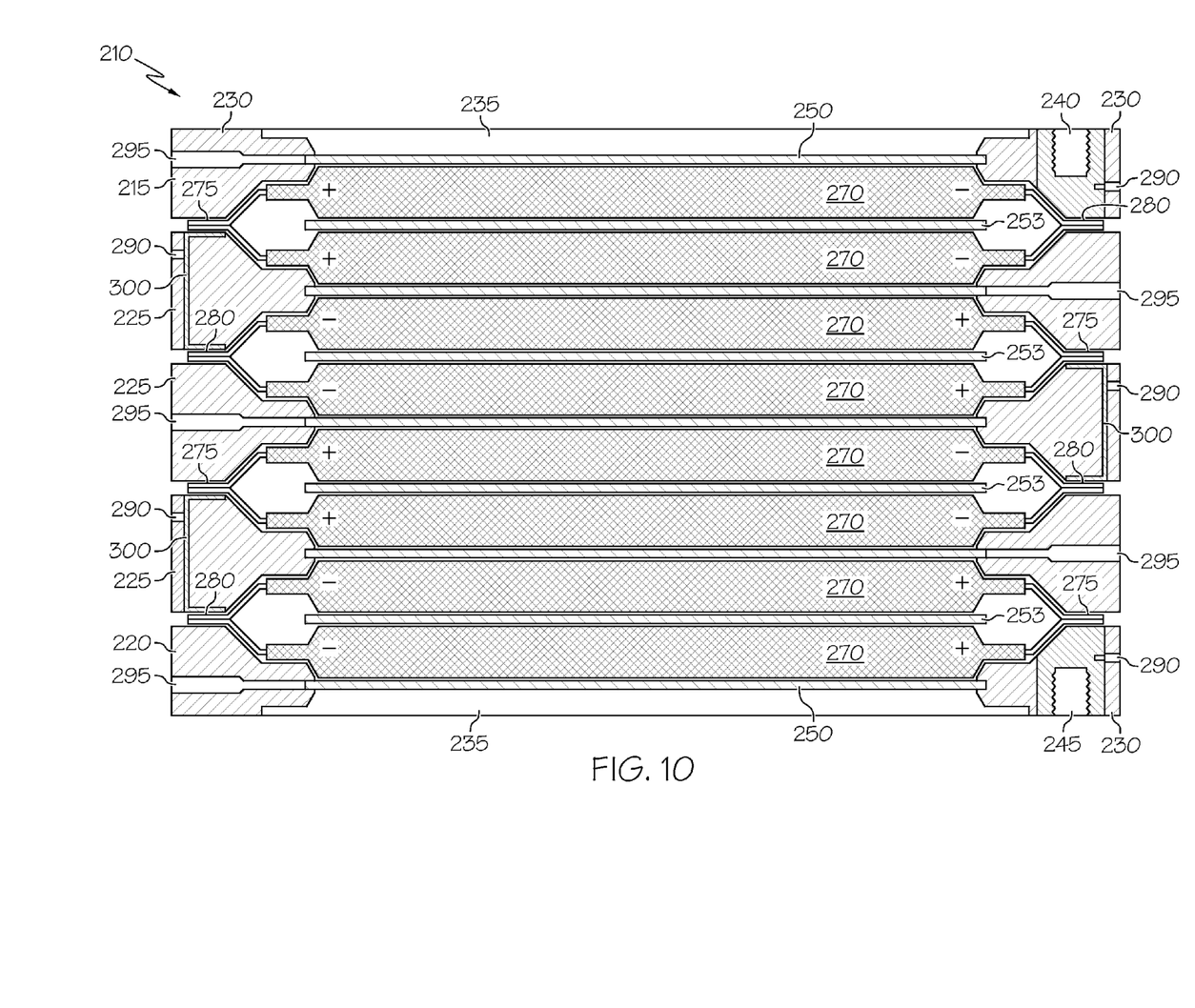
FIG. 10 is a top plan view of another embodiment of an assembled battery pack.
Figure 11:
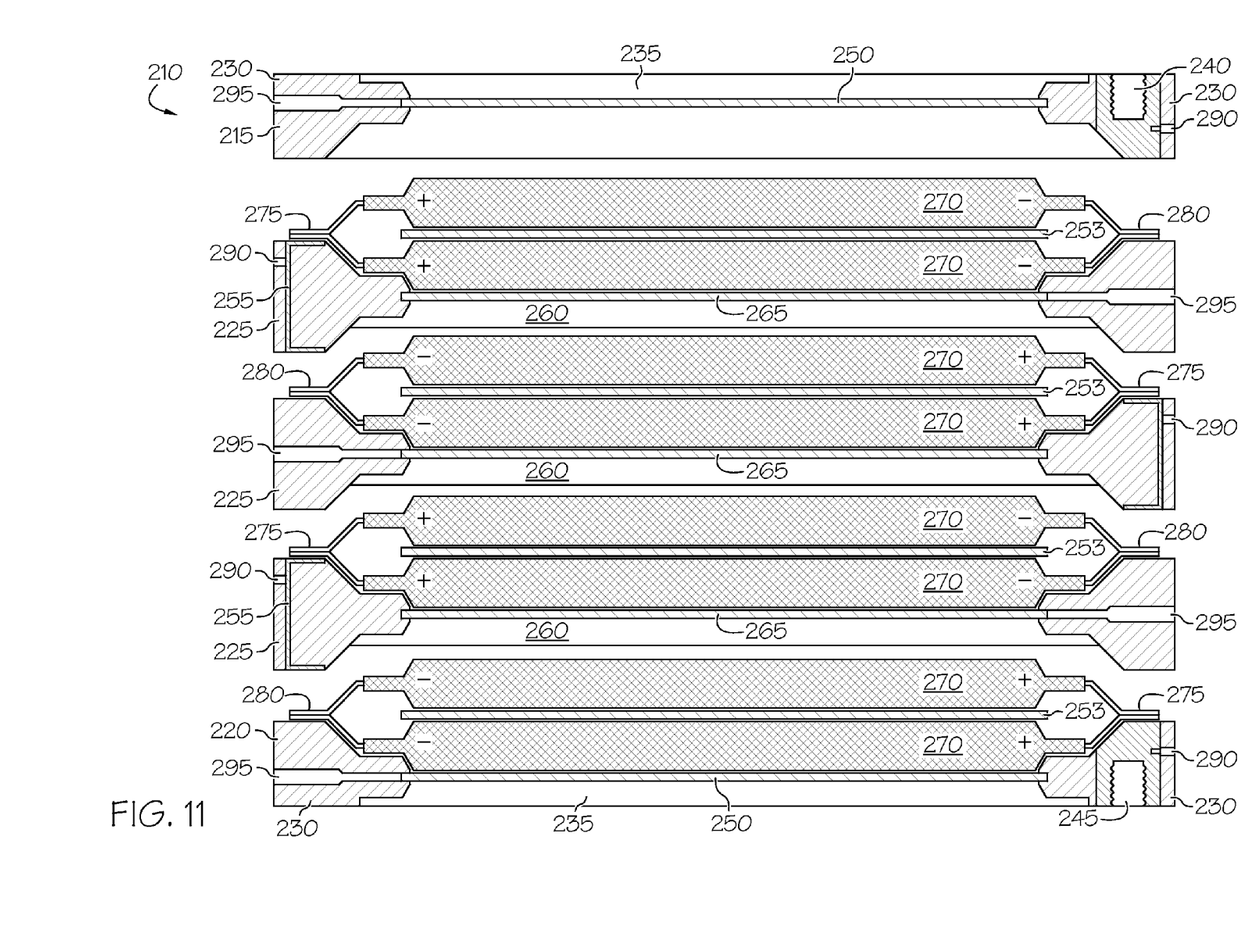
FIG. 11 is an exploded view of the embodiment of FIG. 10.
Figure 12A:
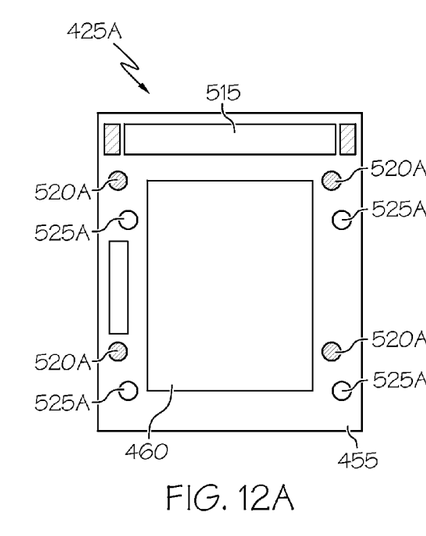
FIG. 12A-D are an illustration of two embodiments of the integrated frames.
Figure 12B:
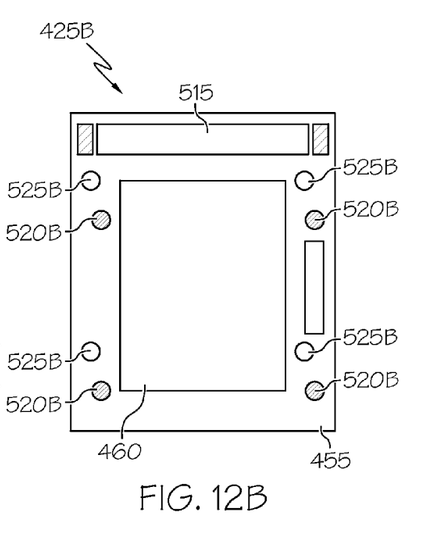
Figure 12C:
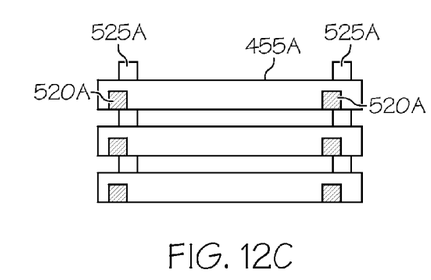
Figure 12D:
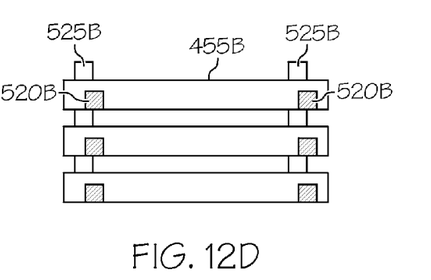

FIGS. 10-11 show another embodiment in which battery cells are connected in parallel. The battery pack 210 has a pair of end frames 215, 220 and frames 225 positioned between the end frames 215, 220. The end frames 215, 220 have raised edge portions 230 surrounding an inner portion 235. There is a negative terminal 240 in end frame 215 and a positive terminal 245 in end frame 220. The end frames 215, 220 can include a cooling fin 250 extending across the inner portion 235, if desired.

The frames 225 have raised outer portions 255 surrounding inner portions 260. The frames 225 can include a cooling fin 265 extending across the inner portion 260, if desired.

Pairs of battery cells 270 are positioned in the inner portion 260 of the frames 225 and end frame 220. The pairs of battery cells 270 have positive tabs 275 and negative tabs 280. The pairs of battery cells 270 can be separated by loose cooling fins 253, if desired.

The battery cells 270 and the positive tabs 275 and negative tabs 280 are supported by the raised edge portions 255 of the frames 225 or the raised edge portions 230 of the end frame 220. The battery cells 270 might also supported by the cooling fins 250 and 265.

The raised portions of the end frames and frames are different in this embodiment from those in the single battery cell embodiment. The frames will be wider in order to accommodate both cells and the loose cooling fins, if present.

The frames and/or the end frames can optionally include voltage sensor holes 290 and/or temperature sensor holes 295.

The positive tabs 275 and negative tabs 280 of adjacent battery cells are electrically connected by power connectors as described above, for example. The power connector can be an internal power connector or an external power connector, such as a spring loaded metal clip 300.

The frames can include error proofing features, if desired. Error proofing features help to prevent mistakes by allowing assembly to occur only is the correct way. Error proofing features are well known in the art.

FIGS. 12A-D show one example of frames with error proofing features. There are right and left frames 425A and 425B. The frames have raised edge portions 455 (shown generally as 455 in FIGS. 12A and 12B, and with particularity as 455A in FIG. 12C and as 455B in FIG. 12D) and inner portions 460. There are cooling channels 515. There are interlocking holes 520A and 520B and pins 525A and 525B. The interlocking pins and holes interlock the frames. The interlocking holes 520 and pins 525 can be offset on the right and left frames. The right frame could have two sets of holes and two sets of pins offset from the holes, while the left frame had two sets of pins corresponding to the holes in the right frame and two sets of holes corresponding to the pins in the right frame. The holes 520A on the right frame 425A mate with the pins 525B on the left frame 425B, and the pins 525A on the right frame 425A mate with the holes 520B. The right frames 425A and left frames 425B can be easily stacked and separated as shown in FIGS. 8C-D.

Right and left frames 425A and 425B would be alternated to make the battery pack. This arrangement makes assembly of the battery pack error proof because the offset of the pins and holes require alternating right and left frames.

Figure 13A:
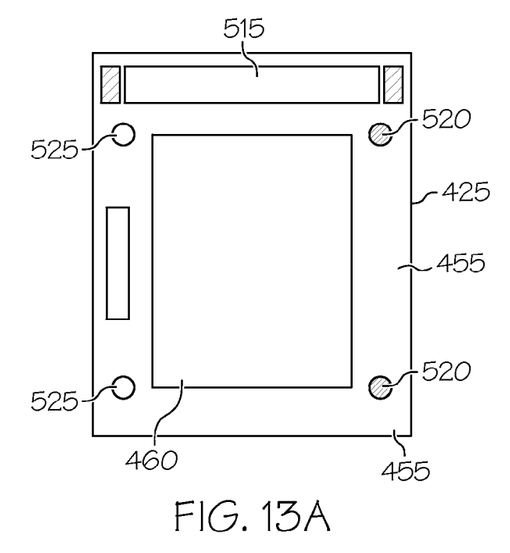
FIG. 13A-C are an illustration of another embodiment of an integrated frame.
Figure 13B:
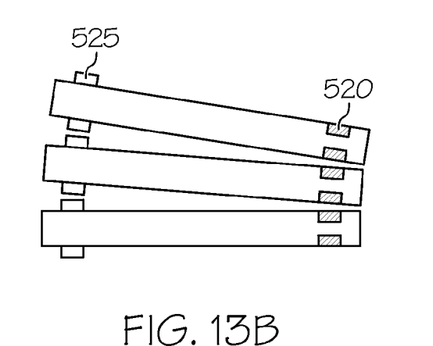
Figure 13C:
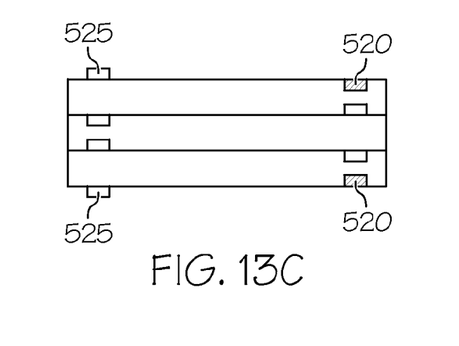

A universal frame could be used as shown in FIGS. 13A-C and 14A-C. In the embodiment shown in FIGS. 13A-C, the frame 425 has raised edge portions 455 and inner portion 460. There are cooling channels 515. There are symmetric interlocking holes 520 and pins 525. In this arrangement, the pins are always on one side and the holes are always on the other, which makes stacking and unstacking somewhat more difficult. The frames are flipped over when manufacturing the battery pack, as shown in FIG. 13C, providing error proof manufacturing.

Figure 14A:
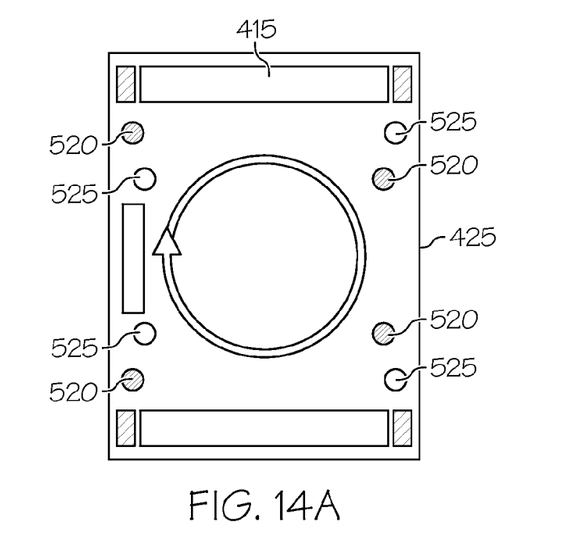
FIG. 14A-C are an illustration of another embodiment of an integrated frame.
Figure 14B:
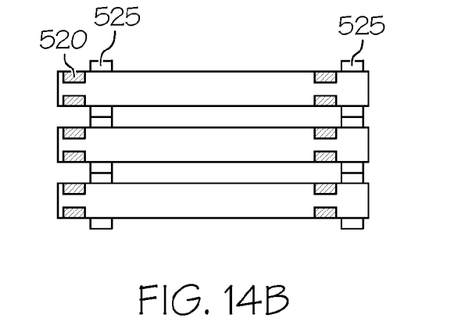
Figure 14C:
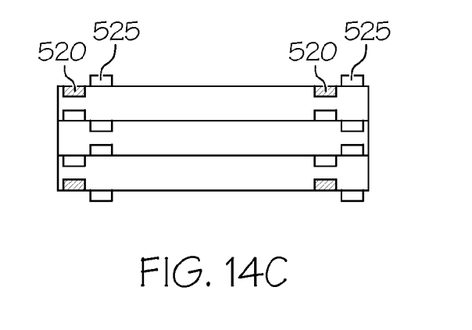

Another universal frame embodiment is shown in FIG. 14A-C. In this embodiment, there is a diagonally symmetric design of pins 525 and holes 520. The frames can be easily stacked and unstacked because they are pin to pin, as shown in FIG. 14B. Every other frame is rotated 180°, providing error proof manufacturing.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A cooling assembly for a battery, the cooling assembly comprising:
 a frame comprising a pair of half frames that are coupled to one another; and
 a cooling fin comprising:
  a corrugated center cooling fin; and
  a pair of outer cooling fins on opposite sides of the corrugated center cooling fin and defining an edge that forms a seal with at least one of the half frames, each of the outer cooling fins having a ridge formed adjacent the edge such that upon receipt of a force imparted onto a generally planar surface of the outer cooling fin from a facingly-adjacent portion of the corrugated cooling fin, the force couples with the ridge to substantially decouple the force from the edge of the outer cooling fin in order to prevent damage to the seal.

2. The cooling assembly of claim 1 wherein the corrugated cooling fin, or the outer cooling fin, or both, is made of a thermally conductive material.

3. The cooling assembly of claim 2 wherein the thermally conductive material is aluminum.

4. The cooling assembly of claim 1 wherein the frame is molded with the outer cooling fins forming the seal.

5. The cooling assembly of claim 4 wherein the frame is insert molded with the outer cooling fins forming the seal.

6. The cooling assembly of claim 1 wherein the half frame is insert molded with the outer cooling fin forming the seal.

7. The cooling assembly of claim 1 wherein the half frames are connected by heat staking, ultrasonic welding, laser welding, vibration welding, mechanical connections, glue, or combinations thereof.

8. The cooling assembly of claim 1 wherein the frame has at least one hole for a mechanical connector.

9. The cooling assembly of claim 1 wherein the frame has at least one tab with a hole for a mechanical connector.

10. The cooling assembly of claim 1 wherein the ridge extends completely around the edge of the outer cooling fin.

11. The cooling assembly of claim 1 wherein the ridge extends away from the corrugated center cooling fin.

12. The cooling assembly of claim 1 further comprising a compression limiter.

13. A battery pack comprising;
 a pair of end frames, one end frame having a positive terminal and the other end frame having a negative terminal;
 a force-dissipating cooling assembly comprising:
  a frame cooperative with the end frames and comprising a pair of half frames that are coupled to one another; and
  a cooling fin comprising:
   a corrugated center cooling fin; and
   a pair of outer cooling fins on opposite sides of the corrugated center cooling fin and defining an edge that forms a seal with at least one of the half frames, each of the outer cooling fins having a ridge formed adjacent the edge such that upon receipt of a force imparted onto a generally planar surface of the outer cooling fin from a facingly-adjacent portion of the corrugated cooling fin, the force couples with the ridge to substantially decouple the force from the edge of the outer cooling fin in order to prevent damage to the seal;

a plurality of battery cells placed within the frames, each of the plurality of battery cells having a positive tab and a negative tab, the positive tab of one of the plurality of battery cells electrically connected to the positive terminal, and the negative tab of another one of the plurality of battery cells electrically connected to the negative terminal; and at least one power connector electrically connecting the negative tab of one of the battery cells with the positive tab of an adjacent one of the plurality of battery cells.

14. The battery pack of claim 13 wherein the half frame is insert molded with the outer cooling fin forming the seal.

15. The battery pack of claim 13 wherein the half frames are connected by heat staking, ultrasonic welding, laser welding, vibration welding, mechanical connections, glue, or combinations thereof.

16. A method of making a cooling assembly for a battery, the cooling assembly comprising a molded cooling fin and frame, the method comprising:

molding a frame portion over an edge of an outer cooling fin forming a seal between the frame and the outer cooling fin to form a half frame, the outer cooling fin having a ridge formed adjacent the edge;

placing a pair of half frames around a center corrugated cooling fin; and connecting the pair of half frames together; and providing that upon receipt of a force imparted onto a generally planar surface of the outer cooling fin from a facingly-adjacent portion of the corrugated cooling fin, the force couples with the ridge to substantially decouple the force from the edge of the outer cooling fin in order to prevent damage to the seal.

17. The method of claim 16 wherein the molding is insert molding.

18. The method of claim 16 wherein the joining is by heat staking, ultrasonic welding, laser welding, vibration welding, mechanical connections, glue, or combinations thereof.

* * * * *